United States Patent
Yanamadala et al.

(10) Patent No.: US 10,678,951 B2
(45) Date of Patent: Jun. 9, 2020

(54) TAMPER DETECTION COUNTERMEASURES TO DETER PHYSICAL ATTACK ON A SECURITY ASIC

(75) Inventors: Subbayya Chowdary Yanamadala, Frisco, TX (US); Anish Dhanekula, Addison, TX (US)

(73) Assignee: Maxim Integrated Products, Inc., San Jose, CA (US)

( * ) Notice: Subject to any disclaimer, the term of this patent is extended or adjusted under 35 U.S.C. 154(b) by 1455 days.

(21) Appl. No.: 13/280,205

(22) Filed: Oct. 24, 2011

(65) Prior Publication Data

US 2013/0104252 A1 Apr. 25, 2013

(51) Int. Cl.
*G06F 21/76* (2013.01)

(52) U.S. Cl.
CPC .................................... *G06F 21/76* (2013.01)

(58) Field of Classification Search
CPC ........... G06F 21/86; G06F 21/87; G06F 21/76
USPC .......................................................... 726/34
See application file for complete search history.

(56) References Cited

U.S. PATENT DOCUMENTS

| 2001/0033012 A1* | 10/2001 | Kommerling | G06F 21/86 257/679 |
|---|---|---|---|
| 2009/0001821 A1* | 1/2009 | Walker et al. | 307/413 |
| 2009/0077669 A1* | 3/2009 | Buer | 726/26 |

OTHER PUBLICATIONS

Office Action dated Aug. 23, 2016, in Chinese Patent Application No. 201210405578.6, filed Oct. 23, 2012 (18pgs).
Notification of Granting a Patent Right dated Apr. 6, 2017, in Chinese Patent Application No. 201210405578.6, filed Oct. 23, 2012 (4pgs).

* cited by examiner

*Primary Examiner* — Jeffrey D. Popham
(74) *Attorney, Agent, or Firm* — Michael North

(57) ABSTRACT

Various embodiments of the present invention relates generally to an integrated circuit, and more particularly, to systems, devices and methods of incorporating a tamper detection countermeasure into a security ASIC to deter physical attacks. The tamper detection countermeasure architects an active mesh to cover a sensitive area in the security ASIC. A plurality of time-varying random numbers is generated by a random number generator (RNG), and the active mesh is driven and configured according to these random numbers. During tamper detection cycles, the active mesh is monitored with respect to the plurality of random numbers that is directly provided by the RNG. Upon a tampering attempt, a flag signal is generated and used to initialize subsequent anti-tampering actions. The active mesh may be controlled and monitored based on time-varying codes, and therefore, an adversary may not easily bypass the active mesh and attack the sensitive area.

14 Claims, 6 Drawing Sheets

TAMPER DETECTION COUNTERMEASURES TO DETER PHYSICAL ATTACK ON A SECURITY ASIC

BACKGROUND

A. Technical Field

The present invention relates generally to an integrated circuit, and more particularly, to systems, devices and methods of incorporating a tamper detection countermeasure into a security ASIC to deter physical attacks. The tamper detection countermeasure architects an active mesh to cover a sensitive area in the security ASIC, and the active mesh is driven or configured by time-varying codes such that an adversary may not easily bypass the active mesh and attack the sensitive area.

B. Background of the Invention

An application specific integrated circuit (ASIC) may be used to process, store and communicate sensitive data in security-sensitive applications that involve trusted operations on valuable assets. This sensitive data may include account numbers, access codes, private information, financial transactions/balances, rights management, metering data (e.g., energy, units), confidential program algorithms and other information. To date, this type of security ASICs has been applied in a wide variety of applications, such as electronic banking, commercial transactions, and pay-TV access control, consumable authentication or any application that requires protection of sensitive data.

A thief or adversary may attempt to gain access to the sensitive data in the security ASIC through tampering sensitive areas within the ASIC. In order to deter these tampering attempts, the sensitive areas are either selectively covered by a shielding layers of metal, or contained within a shielding package that encloses the entire ASIC. The adversary has to probe through the shielding layer or package to gain unauthorized access to the sensitive areas and data.

In a conventional security ASIC, the shielding layer is configured as a network of conductive traces that covers the sensitive areas. Each of these traces has two end nodes, and one of the nodes is driven by a static logic level (e.g., high or low), while the other is monitored by a sense circuit. When the detected level is inconsistent with the static logic level, the trace is broken to open or is shorted to another trace, and thus, a physical attack is detected on the shielding layer.

However, the above tamper detection countermeasure only detects opens or shorts of the conductive traces in the shielding layer by monitoring the static logic level. This countermeasure is easy to defeat using a focused ion beam (FIB) machine in conjunction with invasive probing. When an adversary applies the FIB machine to probe the trace, the static logic level on each trace may be traced & deciphered, and thereafter, the adversary may apply the static logic level directly on the end node for sensing to bypass the conductive trace. More straightforwardly, the adversary may even short two ends of the trace to circumvent this countermeasure. As hacking techniques get increasingly sophisticated, such a simple countermeasure cannot be used to effectively deter tampering attempts. As a result, competitive tamper detection countermeasures are needed at a relatively low cost to prevent unauthorized accesses to a security ASIC, and particularly, to those involved in lucrative transactions.

SUMMARY OF THE INVENTION

Various embodiments of the present invention relates generally to an integrated circuit, and more particularly, to systems, devices and methods of incorporating a tamper detection countermeasure into a security ASIC to deter physical attacks. In particular, the tamper detection countermeasure architects an active mesh to cover a sensitive area in the security ASIC. The active mesh is controlled and monitored based on time-varying codes, such that an adversary may not easily bypass the active mesh and attack the sensitive area.

One aspect of the invention is a tamper detection method. A plurality of time-varying random numbers is generated by a random number generator(s) (RNG), and an active mesh is driven and configured according to these random numbers. During tamper detection cycles, the active mesh is monitored with respect to the plurality of random numbers that is directly provided by the RNG(s). Upon a tampering attempt, a flag signal is generated and used to initialize subsequent anti-tampering actions.

One aspect of the invention is a tamper detection system based on an active mesh comprising a plurality of conductive metal wires. The tamper detection system further comprises a RNG, a mesh driver and a tamper sensing unit. The RNG generates at least one time-varying random number including a plurality of bits. The mesh driver drives the active mesh with a time-varying driving pattern according to the at least one random number. The tamper sensing unit monitors all conductive metal wire selected from the plurality of metal wires, verifies the voltage with respect to a corresponding bit in the plurality of bits, and generates a flag signal.

One aspect of the invention is a tamper detection system based on an active mesh comprising a plurality of capacitors. The tamper detection system further comprises a RNG, a mesh driver and a tamper sensing unit. The RNG generates at least two time-varying random numbers. The mesh driver selects at least two capacitors from the plurality of capacitors according to the at least two random numbers. The tamper sensing unit compares the capacitances of these two selected capacitors, detects a disparity between the capacitances, and generates a flag signal.

Certain features and advantages of the present invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

In the following description, for purposes of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of structures. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment.

Furthermore, connections between components or between method steps in the figures are not restricted to connections that are effected directly. Instead, connections illustrated in the figures between components or method steps may be modified or otherwise changed through the addition thereto of intermediary components or method steps, without departing from the teachings of the present invention.

Various embodiments in the present invention relate to systems, devices and methods of incorporating a tamper detection countermeasure into a security ASIC to deter invasive attacks. An active mesh is formed using at least one metal layer that lies above sensitive areas included in the security ASIC. The active mesh may comprise straight wires driven by randomly generated rolling codes. The active mesh may also be configured as a bank of capacitors, and at least one capacitor group is randomly selected and compared according to the rolling codes during a tamper detection cycle. As a result, time-varying mesh configuration and/or time-varying driving pattern is incorporated in the active mesh in the security ASIC to effectively enhance the security level of the security ASIC and reduce its chance of being tampered.

Figure 1A:
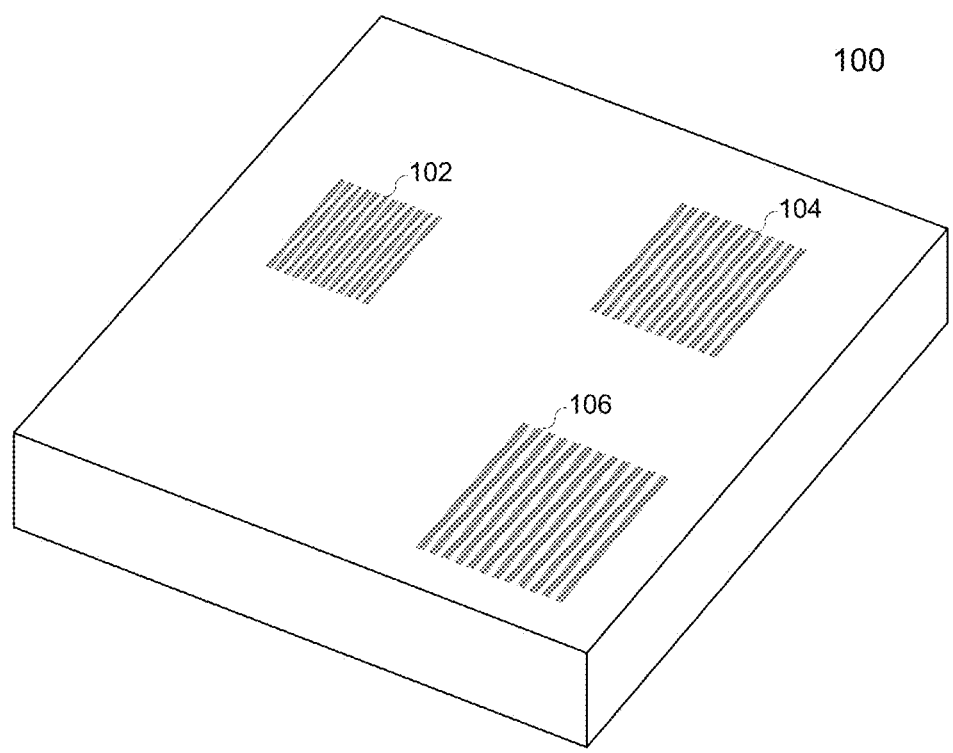
FIG. 1A illustrates an exemplary image of a security ASIC chip including three sensitive areas that are protected by three active meshes according to various embodiments in the invention.

FIG. 1A illustrates an exemplary image 100 of a security ASIC chip including three sensitive areas that are protected by three active meshes according to various embodiments in the invention. The security ASIC 100 contains three sensitive areas where sensitive data are processed or stored in a confidential process. The active meshes 102-106 are arranged above these sensitive areas. An adversary has to break through these active meshes to gain access to underlying circuits and signals. In various embodiments of the invention, any physical attack to these active meshes will be reliably detected by the security ASIC 100 underneath the active meshes.

In certain embodiments, an active mesh is not limited to only covering the sensitive areas. The active mesh may cover non-sensitive areas as a disguise to confuse the adversary. In another embodiment, the entire ASIC is simply covered by one active mesh.

Figure 1B:
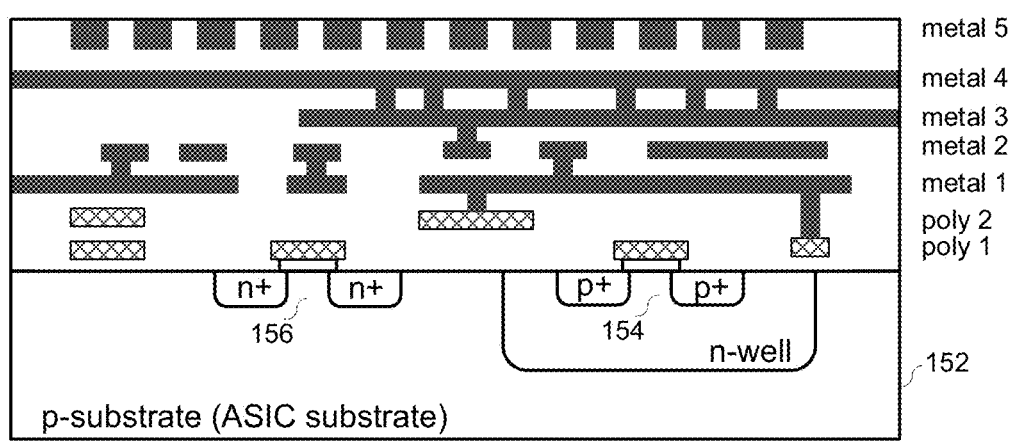
FIG. 1B illustrates an exemplary cross section of a sensitive area in a security ASIC chip according to various embodiments in the invention.

FIG. 1B illustrates an exemplary cross section 150 of a sensitive area in a security ASIC chip according to various embodiments in the invention. The security ASIC chip is built on an ASIC substrate 152 on which a PMOS transistor 154 and a NMOS transistor 156 may be manufactured. In most of the state-of-the-art ASICs, the substrate is made from silicon. The transistors 154 and 156 are used to build signal processing circuits that process the sensitive data. A number of polysilicon layers (e.g., poly 1, poly 2) and metal layers (e.g., metal 1-5) are sequentially manufacturing above the IC substrate 152 as gates and/or interconnects for transistors 154 and 156. The respective number of polysilicon layers and metal layers varies with the manufacturing process of various ASIC chips.

The active meshes 102-106 may be integrated in at least one of the metal layers, and their relevant driving and sensing circuits are included in the underlying signal conditioning circuits. Intermediate metal and polysilicon layers are used to couple the active meshes 102-106 to the driving and sensing circuits.

In certain embodiments, the active meshes 102-106 are not limited to one metal layer, and may be formed from two or more metal layers. One of those skilled in the art knows that the active meshes 102-106 are preferably formed using the top metal layer, although they may be formed from any other metal layer underneath the top metal layer. In certain embodiments, the polysilicon layers is used to couple, but not directly form, the active meshes 102-106.

Figure 2A:
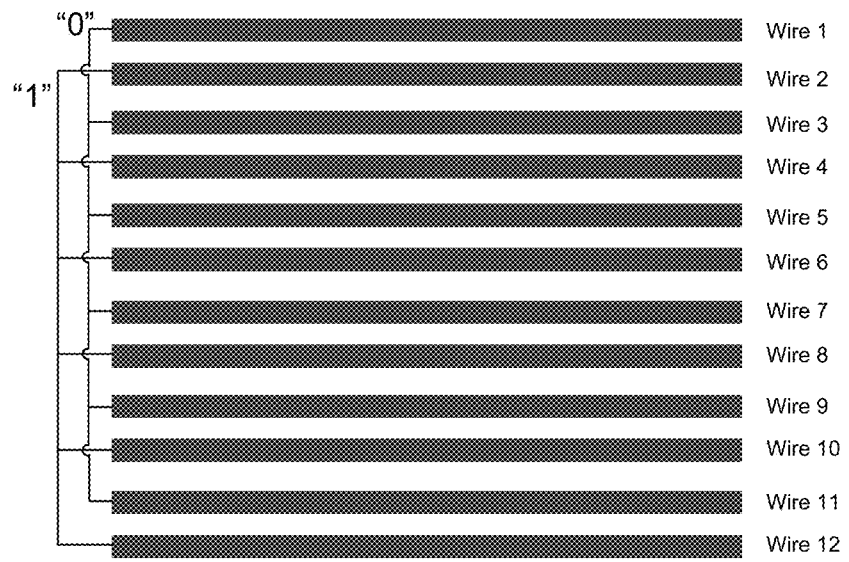
FIG. 2A illustrated an exemplary configuration of an active mesh according to various embodiments in the invention.

FIG. 2A illustrated an exemplary configuration 200 of an active mesh according to various embodiments in the invention. The active mesh comprises of 12 straight conductive metal wires covering an underlying sensitive area from left to right. These 12 wires are alternatively driven statically by logic low and high levels on their left end nodes. The voltage levels are monitored at the right end nodes, and in this particular embodiment, alternate between logic low and high levels according to the corresponding driving voltages.

Figure 2B:
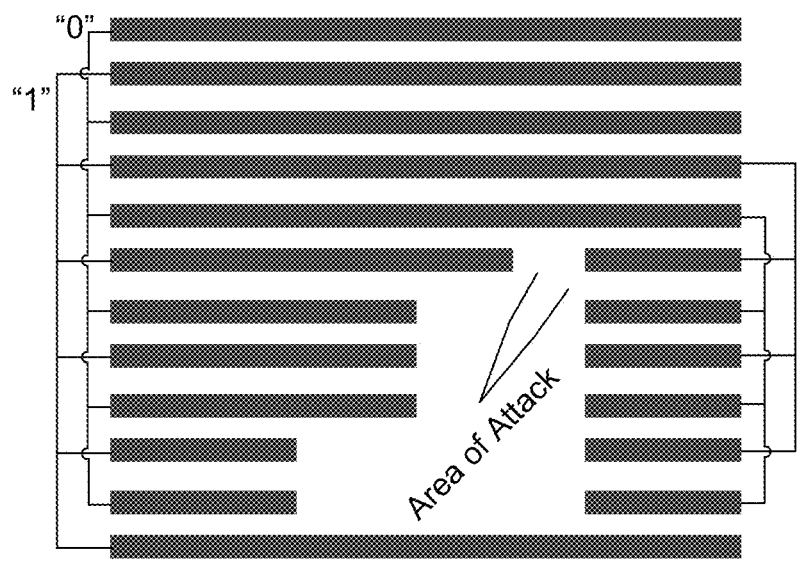
FIG. 2B illustrated an exemplary configuration of a tampered active mesh according to various embodiments in the invention.

FIG. 2B illustrated an exemplary configuration 250 of a tampered active mesh according to various embodiments in the invention. Among the 12 conductive metal wires, six wires (wires 6-11 from the top) are broken to open by an adversary who physically attacks the active mesh to gain an unauthorized access to the underlying sensitive areas in the secure ASIC. Such a tampering attempt is normally easy to identify by monitoring the voltages at the right end nodes of these six wires, if the adversary does not take any measures to cover the attack. However, in this embodiment, the adversary shorts the even-number wires and the odd-number wires, respectively, and couples these two groups of wires to two nearby even- and odd-number wires that are intact. As a result, the tampering attempt may be successfully disguised under this configuration without being detected.

Figure 3A:
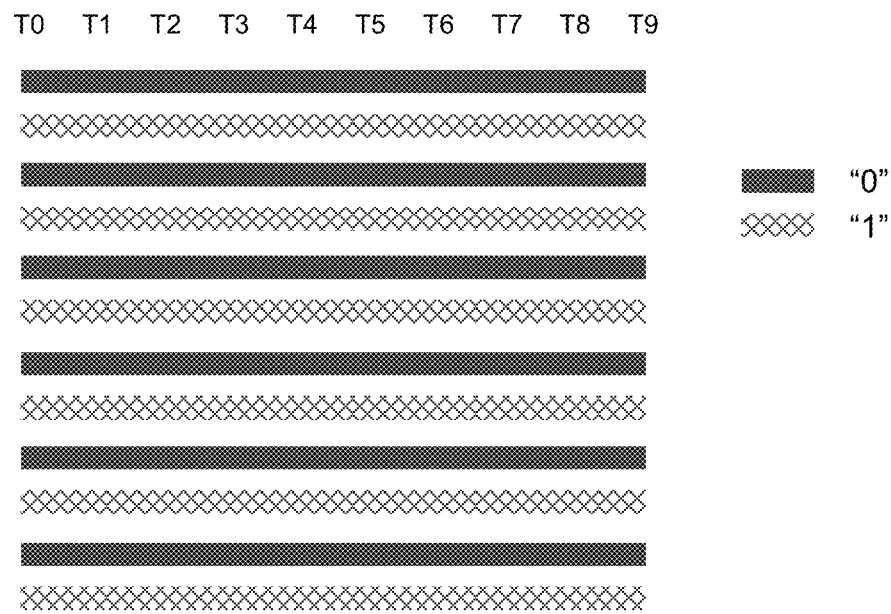
FIG. 3A illustrates an exemplary time diagram of driving voltages applied on an active mesh according to various embodiments of the invention.

FIG. 3A illustrates an exemplary time diagram 300 of driving voltages applied on an active mesh according to various embodiments of the invention. Odd- and even-number wires are respectively driven by a logic low and high voltage, and this driving pattern remains stable over a time period T0-T9. Due to its predictability and stability, the security IC based on such a driving pattern is easy to bypass (e.g., FIG. 2B), and is vulnerable to unauthorized accesses.

Figure 3B:
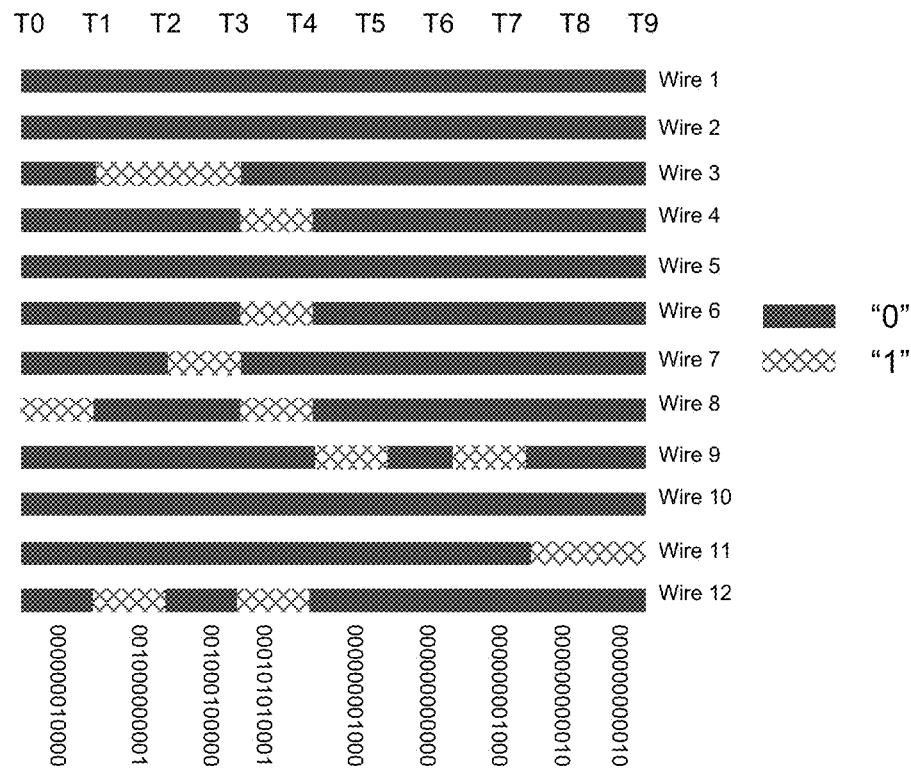
FIG. 3B illustrates another exemplary time diagram of driving voltages applied on an active mesh according to various embodiments of the invention.

FIG. 3B illustrates another exemplary time diagram 300 of driving voltages applied on an active mesh according to various embodiments of the invention. The active mesh includes 12 conductive straight wires covering a sensitive area in the security ASIC from left to right. Randomness and unpredictability are introduced into the driving pattern of the active mesh. Rather than using alternating static levels, the driving voltage for these 12 wires are based on irregular logic levels, and these irregular logic levels are time-varying as well.

The irregular logic levels of these wires may be generated according to a 12-b binary number, and the most and least significant bits are respectively associated with the top and bottom conductive wires (wires 1 and 12). This 12-b binary number is 000000010000 at time T0; sequentially changes to 001000000001, 001000100000, 000101010001, 000000001000, 000000000000, 000000001000 and 000000000010 during subsequent eight tamper detection cycles; and reaches 000000000010 at time T9. As a result, randomness and unpredictability are incorporated not only among the conductive wires within one cycle but also during consecutive cycles for each individual conductive wire.

The time-varying driving pattern imposes a huge challenge on an adversary. Most of the conventional tampering attempts rely on an approach of bypassing the attacked area, and this approach will be useless in an attempt to attack the active mesh that adopts the time-varying driving pattern. Furthermore, in order to implement such a driving pattern, additional digital circuit modules are needed and may be integrated on the existing ASIC substrate. Cost and power of the circuit modules may be maintained at a reasonable level.

Figure 4:
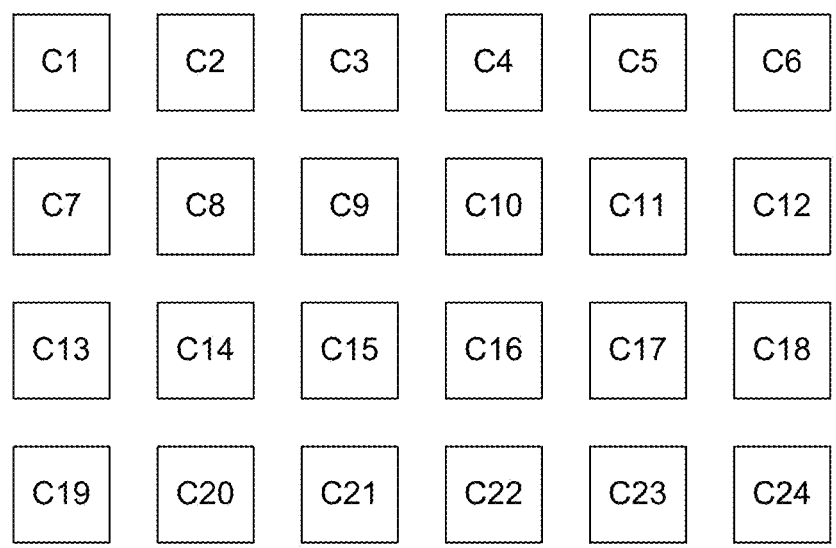
FIG. 4 illustrates an exemplary diagram of an active mesh based on a bank of capacitors according to various embodiments of the invention.

FIG. 4 illustrates an exemplary diagram of an active mesh 400 based on a bank of capacitors according to various embodiments of the invention. The active mesh 400 comprises 24 identical capacitors (C1-C24) arranged in 6 columns and 4 rows, and a sensitive area is protected underneath this active mesh. Two metal layers are selected to form the bank of capacitors, and the top and bottom electrodes of each capacitor are routed to electronics on the underlying ASIC substrate via the intermediate metal and polysilicon layers. The capacitance of each capacitor is determined by an area of the capacitor and a thickness of a dielectric layer separating these two metal layers.

During a tamper detection cycle, groups of capacitors are randomly selected for comparison. Two capacitors within an intact capacitor pair shares approximately equal capacitance. Upon a tampering attempt, at least one capacitance of the capacitors changes to a different value due to the variation of the capacitor area or dielectric thickness. As a result, the capacitances of two capacitors in the pair differ from each other. This disparity within the selected capacitor pair indicates that a tampering attempt occurs and impacts at least one capacitor within the selected capacitor pair.

In various embodiments of the present invention, a set of capacitor pairs may be selected and monitored during one tamper detection cycle. The disparity within each capacitor pair may be mapped for the entire active mesh 400, and therefore, used to indicate the location and affected area of the tampering attempt. In certain embodiments, only a limited number (e.g., 4) of capacitor pair is randomly selected for comparison in order to obtain a fast detection rate.

Selection of capacitor pairs may vary with time to result in a time-varying mesh configuration. During consecutive tamper detection cycles, various capacitor pairs are randomly selected. It is extremely difficult for an adversary to predict which capacitors are monitored, and as a result, an adversary may not properly generate a disguise signal to the tampering attempt. Despite its robustness over tampering attempts, the time-varying mesh configuration may require an analog signal processor. In comparison to the digital circuit modules used to generate driving patterns, the analog signal processor may consume more power.

Figure 5:
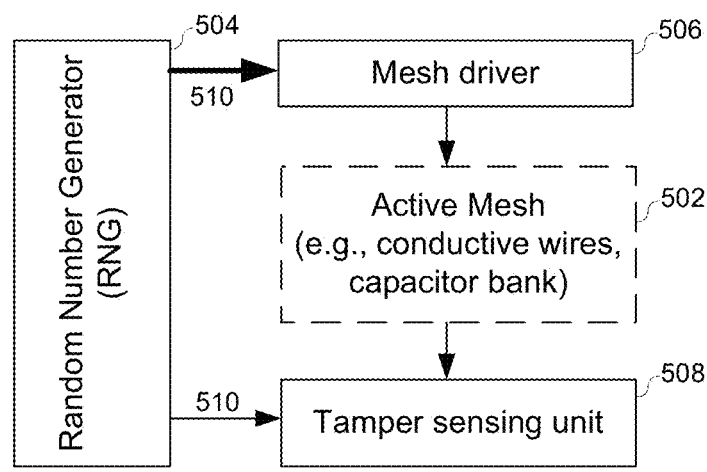
FIG. 5 illustrates an exemplary block diagram of a tamper detection system based on time-varying control of an active mesh according to various embodiments of the invention.

FIG. 5 illustrates an exemplary block diagram of a tamper detection system 500 based on time-varying control of an active mesh 502 according to various embodiments of the invention. The tamper detection system 500 comprises an active mesh 502, a random number generator (RNG) 504, a mesh driver 506, and a tamper sensing unit 508. The active mesh 502 is controlled by a time-varying mesh configuration and/or driving pattern during consecutive tamper detection cycles such that an adversary may not easily predict and break down the anti-tamper countermeasure.

The active mesh 502 comprises an array of conductive wires or capacitors that are arranged above a sensitive area of a security ASIC. The active mesh 502 is formed using the metal layers that originally exist in the security ASIC as interconnect materials. Two end nodes of each conductive wire and two electrodes of each capacitor are routed to an integrated circuit that lies underneath the metal layers within the ASIC substrate using the intermediate metal and polysilicon layers.

The RNG 504 generates at least one random number 510 to drive the active mesh 502 with a time-varying mesh configuration and/or driving patterns. In one embodiment, a 12-b binary random number is generated to drive a respective end node of twelve parallel conductive wires that are included in an active mesh 502. Each bit is associated with a logic level applied at the respective end node. The logic level at the other end node of each conductive wire is monitored and compared to the corresponding bit in the 12-b binary number provided by the RNG 504. In another embodiment, four pairs of random numbers 510 are generated between 1 and 24 by the RNG 504. Each random number is associated with one capacitor in a 6×4 capacitor bank that is used as an active mesh 502. Capacitors in each pair are compared, and a disparity in their capacitances may be associated with a tampering attempt. In the above two embodiments, the random number 510 varies during consecutive tamper detection cycles, and therefore, the driving pattern and the mesh configuration may be randomly programmed accordingly.

The mesh driver 506 is coupled between the RNG 504 and the active mesh 506. During a certain detection cycle, the mesh driver 506 receives at least one random number 510 from the RNG 504, determines a driving pattern and a mesh configuration, and controls the active mesh 502 accordingly. Based on the random number 510, the mesh driver 506 controls the active mesh 502 with a time-varying driving pattern and/or a time-varying mesh configuration.

In one embodiment, the mesh driver 506 may further comprises a state machine to control temporal variations of the driving pattern and the mesh configuration. Cache memories or data registers may also be included to store a plurality of random numbers 510 that are sequentially used to configure or drive the active mesh 502.

The tamper sensing unit 508 is coupled both the RNG 504 and the active mesh 502. During a certain tamper detection cycle, the tamper sensing unit 508 receives the random numbers 510 from the RNG 504, determines sensing nodes, and verifies the outputs at the sensing nodes according to the random numbers 510.

In one embodiment, a plurality of parallel conductive wires in the active mesh 502 is driven by a time-varying driving pattern according to the random number 510. The tamper sensing unit 508 may select a number of the conductive wires to monitor, or scan through all available conductive wires. During each detection cycle, the outputs at the sensing nodes are compared with the corresponding bits in the random number 510 that is directly provided by the RNG 504, and an inconsistency between them is probably associated with a tampering attempt. This time-varying driving pattern may be used to detect and deter many tampering attempts, e.g., shorting one particular sensing node to one nearby conductive wire and applying a constant voltage on the wire being sensed.

In another embodiment, capacitor pairs are selected by the mesh driver 506 from an active mesh 510 according to the random number 510 provided by the RNG 504. The tamper sensing unit 508 comprises at least one capacitance comparator that is coupled to one capacitor pair selected according to the random number 510. Upon a tampering attempt, the disparity is detected between two capacitances in a capacitor pair by the capacitance comparator.

The tamper sensing unit 508 outputs a flag signal indicating whether a tampering attempt is detected. In various embodiments of the invention, the tampering attempt may be accurately identified to a certain wire or capacitor within the active mesh 502. Subsequently, the flag signal may be applied to enable a number of actions including erasing sensitive data, triggering a non-maskable interruption, writing a value in a flag register, skipping function blocks being tampered, resetting the security ASIC, and running a dedicated code.

While the active mesh 502 is integrated in the metal layers above an ASIC substrate, the random number generator 504, the mesh driver 506, and the tamper sensing unit 508 are implemented on the ASIC substrate. The active meshes are coupled to these integrated circuits in the tamper detection system 500 via routing paths formed using the intermediate metal and polysilicon layers.

Conductive wires and the capacitors in the active mesh 502 are coupled to the underlying integrated circuit via analog switches that are also included in the ASIC substrate. In one embodiment, for each conductive wire, an analog switch is included in the mesh driver 506, controlled to couple the time-varying driving pattern to an end node of the wire. Another analog switch is included in the tamper sensing unit 508, and coupled to sense the voltage at the other end node of the wire. In another embodiment, one respective electrode of all capacitors in the active mesh 502 shares the ground. The other electrodes are coupled to a respective analog switch. These analog switches are enabled by the mesh driver 506 according to the random number 510, and used to couple the capacitors to the capacitance comparator in the tamper sensing unit 508. Therefore, these analog switches may be regarded as a part of the mesh driver 506 or a part of the tamper sensing unit 508.

One of those skilled in the art also know that the active mesh 502 may also be implemented as an array of resistors that is arranged in a similar configuration to the exemplary capacitor bank 400. Resistors are selected according to at least one random number generated by the RNG 510, and configured to form a resistor bridge or string. The mesh driver 506 may drives the resistor bridge or string in a specific manner, e.g., a time-varying driving pattern according to the at least one random number. The tamper sensing unit 508 monitors a voltage at a node within the resistor bridge or string to verify whether the voltage at the node is consistent with the configuration and the driving pattern of the resistor bridge or string. The tampering location is thus identified to each resistor in the array of resistors, i.e., the active mesh 502.

Figure 6:
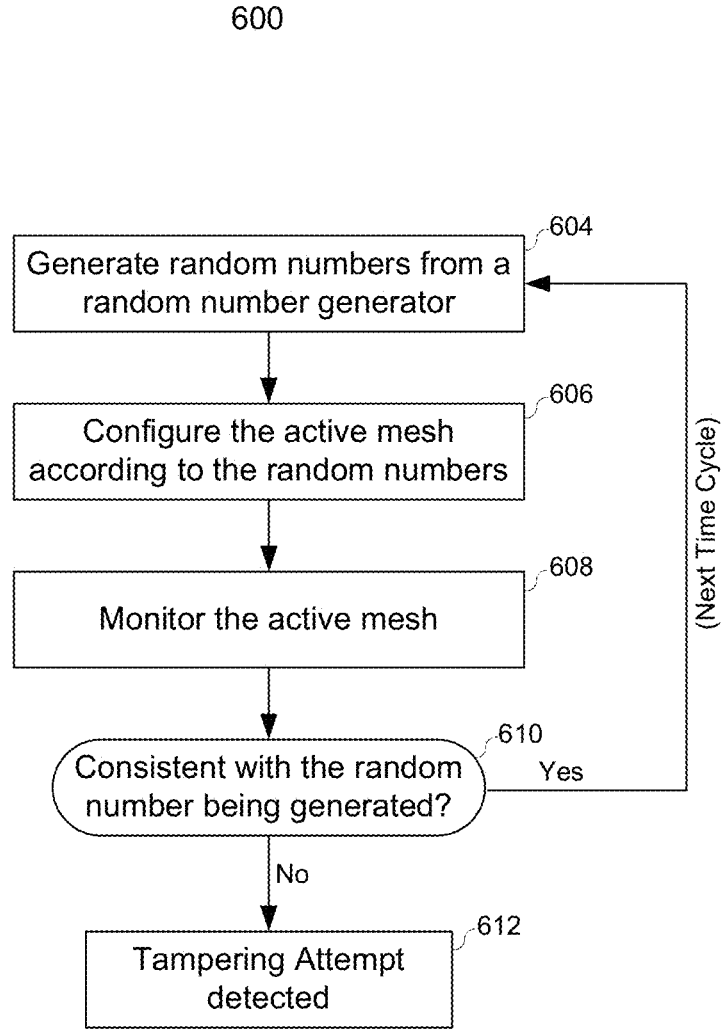
FIG. 6 illustrates an exemplary flow chart of a tamper detection method according to various embodiments in the invention.

FIG. 6 illustrates an exemplary flow chart 600 of a tamper detection method according to various embodiments in the invention. The tamper detection method 600 is based on driving or configuring an active mesh using time-varying codes (i.e., random numbers). The active mesh is manufactured from metal layers above an ASIC substrate and used to protect underlying sensitive circuit area. In one embodiment, the active mesh comprises parallel conductive metal wires that are made from one metal layer. In another embodiment, the active mesh comprises capacitor banks that are made from at least two metal layers.

At step 604, a random numbers is generated by a RNG, and this number varies over tamper detection cycles. During each detection cycle, the active mesh is driven or configured according to the random number at step 606. In some embodiments, the driving pattern for the conductive wires or capacitor pairs in the capacitor bank are randomly determined by the random number, and become unpredictable when the random number varies over detection cycles. At step 608, the configured active mesh is monitored. For the conductive wires, the voltage levels are sensed and verified with the driving pattern based on the random number. For a capacitor bank, two capacitors in any selected capacitor pair are compared in a capacitance comparator.

At step 610, the monitoring result from step 608 is used to determine subsequent steps. When the monitoring result is consistent with the random number, step 610 is followed up with another tamper detection cycle that starts from step 604. However, when the monitoring result is inconsistent with the random number, a tampering attempt is detected at step 612. As a result, the tamper detection process is terminated, and a flag signal is output to enable a sequence of anti-tamper actions.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

What is claimed is:

1. A method of detecting a tampering attempt in a secure application specific integrated circuit (ASIC), comprising steps of:
   generating a plurality of random numbers that varies with time;
   using a mesh driver that determines a driving pattern and a mesh configuration to drive an active mesh according to the plurality of random numbers, the active mesh comprising sensing nodes;
   monitoring sensing nodes with respect to the plurality of random numbers by comparing outputs at the sensing nodes with the random numbers to detect an inconsistency, the sensing nodes being coupled to one or more analog switches; and generating a flag signal that indicates the tampering attempt, wherein the active mesh is made from at least one metal layer above a substrate of the secure ASIC and is routed to the substrate via intermediate metal and polysilicon layers.

2. The method of detecting the tampering attempt in claim 1, further comprising a plurality of conductive metal wires.

3. The method of detecting the tampering attempt in claim 2, wherein at least one random number in the plurality of random numbers comprises a plurality of bits, and the step of driving and configuring the active mesh further comprises a step of:

driving a first end node of each conductive metal wire in the plurality of conductive metal wires at a logic level determined by a bit in the plurality of bits.

4. The method of detecting the tampering attempt in claim 3, wherein the step of monitoring the active mesh further comprises steps of:

monitoring a voltage at a second end node of at least one conductive metal wire selected from the plurality of conductive metal wires;

verifying the voltage with respect to a corresponding bit in the plurality of bits; and generating a flag signal.

5. The method of detecting the tampering attempt in claim 3, wherein driving a first end node comprises coupling a time-varying driving pattern to the first end node of each conductive metal wire in the plurality of conductive metal wires.

6. The method of detecting the tampering attempt in claim 2, wherein monitoring comprises selecting a number of the conductive wires to monitor.

7. The method of detecting the tampering attempt in claim 2, wherein the plurality of conductive metal wires are coupled to analog switches that are located in the substrate.

8. The method of detecting the tampering attempt in claim 1, wherein driving and configuring comprises controlling temporal variation of a time-varying driving pattern using a state machine.

9. A tamper detection system that protects a sensitive area in a secure application specific integrated circuit (ASIC), comprising:

an active mesh that comprises a plurality of conductive metal wires, the active mesh covering the sensitive area;

a random number generator (RNG) that generates at least one random number, the at least one random number comprising a plurality of bits and varying with time;

a mesh driver, coupled between the active mesh and the RNG, the mesh driver determines a driving pattern and a mesh configuration to drive the active mesh with a time-varying driving pattern according to the at least one random number, a first end node of each conductive metal wire in the plurality of conductive metal wires being driven at a logic level determined by a bit in the plurality of bits and being routed to a doped ASIC substrate via routing paths formed by layers of metal and polysilicon; and a tamper sensing unit, coupled to both the active mesh and the RNG, the tamper sensing unit monitoring a voltage at a second end node of at least one conductive metal wire selected from the plurality of metal wires that are coupled to one or more analog switches, verifying the voltage with respect to a corresponding bit in the plurality of bits, and generating a flag signal.

10. The tamper detection system in claim 9, wherein the RNG, the mesh driver and the tamper sensing unit are integrated in the substrate of the secure ASIC.

11. The tamper detection system in claim 9, wherein the mesh driver further comprises a state machine to control a temporal variation of the driving pattern.

12. The tamper detection system in claim 9, further comprising a storage selected from cache memories and data registers to temporarily store the at least one random number.

13. The tamper detection system in claim 9, wherein the tamper sensing unit comprises an analog switch that is controlled by the mesh driver.

14. The tamper detection system in claim 9, wherein the one or more analog switches are located in the substrate.

* * * * *